UNITED STATES PATENT OFFICE.

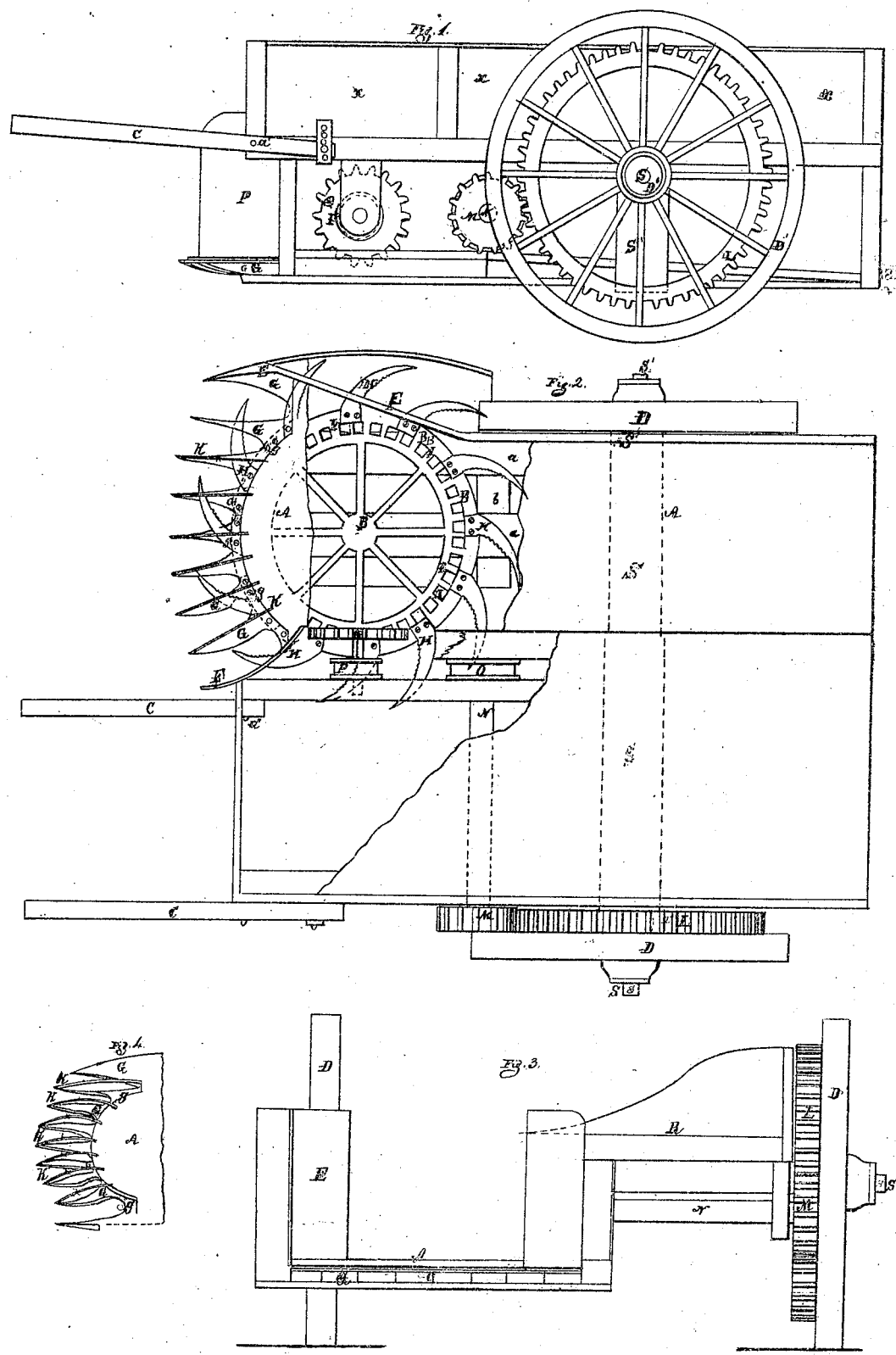
S. Lamb.
Mower.
Nº 1645. Patented June 20. 1840

SETH LAMB, OF NEW YORK, N. Y.

IMPROVEMENT IN MOWING-MACHINES.

Specification forming part of Letters Patent No. 1,645, dated June 20, 1840.

*To all whom it may concern:*

Be it known that I, SETH LAMB, of the city, county, and State of New York, have invented, constructed, and applied to use a new and useful Improvement in the Machinery for Cutting Grass and Grain; and I do hereby declare that the following is a full and exact description thereof, with reference to the accompanying drawings, making part of this specification, and in which the same parts are designated by the same letters of reference in all the different figures.

Figure 1 represents a vertical projection of the geared side of the machine; Fig. 2, a top view, with a part of the floor or casing removed to exhibit the sickle-wheel, gearing, and pulleys and to exhibit their connection and position with the frame of the machine; Fig. 3, a front vertical projection. Fig. 4 is a perspective view of the sickle guides or rests, with bows or guards extending from the front points of the guides to the front edge of the platform.

The nature of my invention consists in attaching sickles to a horizontal wheel, which is placed near the front end at the inside of the machine. Placed beneath the sickle-wheel are guides that project forward and gather the grain or grass, and serve as rests for the revolving sickles to sever the stalk or blade from the roots, and at such height from the ground as desired.

This machine is about nine feet long and seven wide, including the wheels, and is divided longitudinally into two nearly equal parts. The inner or sickle-wheel side or the platform A, Figs. 2, 3, and 4, is placed near the ground, and its forward end, containing the sickle-wheel B, is adjusted to the requisite height for cutting grass or grain by the thills C, which are attached to the machine by confining-bolts $a'$, which form a fulcrum for the thills C to turn upon to regulate the height of the sickle-wheel, and the thills are secured in the requisite position by a bolt, $b'$, at the back end of the front thill, which is placed within a guide, C', containing a number of holes, to suit the various inclinations of the thills that may be required in cutting different kinds of grass or grain, as shown in Figs. 1 and 2. The bolt $b'$ passes through the guide $c'$, the thills C, and into the machine, thus confining it firmly to any position desired. The inner thill, C, placed near the middle of the machine, has only the confining-bolt $a'$, as seen at Fig. 2.

The center and back part of the platform A, which lies back of the sickle-wheel, on which the grain and grass are received when cut, is constructed sufficiently to admit the inner carriage-wheel, D, to pass freely within the standing grain and over the stubble ground, as seen at Fig. 2. The two front guards, E and F, at their forward points are nearly double the width of the platform A within the wheels, and of such height as to secure the grain within them, and their back ends are contracted to conform to the narrow part of the platform A, Figs. 1, 2, and 3.

The sickle-wheel or center B is about four feet in diameter, and is formed of metal, with an external rim, to which the sickles H are attached. Within this rim a sunk gear, I, is formed. The points of the teeth are on a plane with the upper face of the rim, and the spaces between the teeth may be formed into open apertures, or closed at the bottom, as preferred. Within the gearing there is another rim, and the two rims support the ends of the teeth, as they are firmly united thereto. From the inner rim arms project inward and unite at the center and form a hub, with an axle, J, in the center thereof, which projects above and below the hub, and turn in boxes placed in the under frame and the casing above the wheel, which is removed to exhibit the wheel B, and seen at Fig. 2.

The sickles H are attached to the outer rim of the wheel B by bolts or screws, and are about twelve in number, and their curvature and inclination forward are such as to gather the grain. Near their center or inner end the teeth upon the edge of the sickle are placed obliquely thereto, projecting both forward and outward, and as they come in contact with the grain, which is held by the guides or rests G, the rotary motion of the sickles gives a drawing stroke, which severs the stalk or blade from the bottom part, similar to the action of the common sickle by manual labor, which is effected by the curve and inclination of the sickle and the form and position of the guides or rests G, as seen at Fig. 2.

The guides or rests G may have a sharp cutting-edge or teeth, similar to those on the sickles, as most advantageous to the well performance of the machine. The rests G are about nine in number, and their outer or front ends are pointed, and their back ends are secured to a segment-rim, $g$, directly in front and nearly in contact with the wheel B. The rests G are formed in separate pieces, and connected to the rim $g$ by bolts and nuts or rivets, as may be preferred, as shown at Fig. 2. The sides of the guides or rests are curved, and the curves of the inner adjacent guides unite at the outer edge of the segment-rim.

The guides extend forward of the sickles H and gather the grain therefor; but they do not exactly radiate from the center of the wheel B, but are placed as nigh parallel as the action of the sickles will admit; and the shape of the guides are varied, that each guide may have such a form and position that the sickles H may act upon the stalk or blade with a drawing stroke at that part of the guide where it severs the top from the bottom, and not cut at right angles with any of the guides, as shown at Figs. 2 and 4.

The ends of the rim $g$ are secured to the frame, and also to the longitudinal pieces $a$ of the bottom frame, to give it the necessary solidity. From the points of the guides G bows or guards K extend to the front of the platform, which covers the wheel B, Figs. 2 and 4. The guards K are placed above the sickles H, and admit of their turning freely beneath them, and they only operate upon the grain after it has been severed from the bottom, and prevent the sickles from giving it a whirling motion or carrying it to the side of the machine; but they retain it in the place where it is cut, and it falls within the body of the machine, as shown at Figs. 2 and 4. The frame beneath this part of the machine, at the forward end, is as thin as the nature and strength of the machine will permit, and is composed of three longitudinal pieces, $a$, firmly secured by as many transverse pieces $b$ as necessary to give the requisite support.

At the outer or geared side of the machine is placed a carriage-wheel, D', and corresponds with the wheel D at the opposite side of the machine, as seen at Figs. 2 and 3. The outer wheel, D', is placed a sufficient distance from the machine to receive a gear-wheel, L, within it, and is secured to the inner side of the wheel, and is of nearly the same diameter. The wheels D' and L propel the sickle-wheel by the adhesion of the carriage-wheel to the ground. The wheel L connects with and gives motion to a pinion, M, placed in front of the wheel L, and is attached to the outer end of the shaft N. At the opposite end of this shaft, and beneath the platform R, a pulley, O, is secured, and is near the partition or side of the platform A. From this pulley a band passes to a corresponding pulley, P, of smaller dimensions, in front of the large pulley O and on a transverse line with the center of the wheel B. The shaft N and the axle of the pulley P are placed in suitable boxes and connected to the machine by stands. Within the pulley P another gear-wheel, Q, is placed, and is secured to the same shaft or axle, and gives motion to the wheel B, to which the sickles H are attached, as seen at Figs. 1 and 2. The gear Q connects with and gives motion to the sunk wheel I within the rims of the wheel B, and the proportions of the different wheels and pulleys are such as to give the sickles a velocity capable of severing the grain as the machine advances over the ground. The platform R of the geared or out side of the machine is raised sufficient to admit the axle-tree S of the wheel D' beneath it, and at the inner end of this axle-tree a metallic bar, S', is secured, and passes down and under the platform A, and rises at the opposite side of the machine to the same height of the axle-tree S, and forms the axle for the wheel D, Figs. 1 and 2.

At the outside of platform R a frame of panel-work, $x$, rises sufficiently high to prevent the grain from becoming entangled in the gearing L or wheel D' on the outside of the machine when placed upon the platform R, as seen at Figs. 1 and 3. The grain upon the platform A may be removed as often as occasion may require and deposited upon the platform R in quantity sufficient for fifteen or twenty bundles before it is removed from the machine.

The sickle-wheel is placed at the inside of the machine, and occupies but a little more than one-half of the width of the machine, while the platform A, on which the grain is received from the sickle-wheel, is contracted and less in width than the platform R at the outside of the machine, which forms a receptacle for the deposit of grain. By this arrangement the horse can travel in front of the platform R, at the outside of the machine and by the side of the standing grain, in advance of the sickle-wheel, which is at the opposite side of the machine, and projects nearly its whole size into the standing grain, which it cuts and deposits upon the platform A as the machine advances. Another advantage is derived by placing the sickle-wheel at the inside of the machine—the formation of the raised platform R for the deposit of grain which accumulates upon the platform A, and is removed therefrom and placed upon the platform R in quantities sufficient to form a number of sheaves, thus performing the operation of cutting and collecting together the grain at one operation, thus avoiding the trouble of collecting single sheaves by manual labor.

What I claim as my invention, and desire to secure by Letters Patent, is—

1. The bows or guards K, in combination with the guides or rests G, sickles H, and the outer guards, E and F, the same being constructed in the manner and for the purpose as before described.

2. The platform R, the same being constructed and used for the purpose as hereinbefore described.

3. The placing of the sickle-wheel B and its appendages at the inner side of the machine, so as to permit the horse to travel by the side of the grain in front of the machine, and to allow the platform R to extend by the side of it for carrying the grain, substantially as before described.

SETH LAMB.

Witnesses:
   JAMES H. RELLAN,
   ROBERT KERVAN.